US005224255A

United States Patent [19]

Gracey

[11] Patent Number: 5,224,255

[45] Date of Patent: Jul. 6, 1993

[54] HYDRAULIC BEARING PULLER

[76] Inventor: Doyle D. Gracey, P.O. Box 155, Tehachapi, Calif. 93561

[21] Appl. No.: 909,317

[22] Filed: Jul. 6, 1992

[51] Int. Cl.[5] .............................................. B23P 19/00

[52] U.S. Cl. ..................................... 29/426.5; 29/252; 29/253

[58] Field of Search ................. 29/252, 253, 254, 255, 29/256, 263, 426.5

[56] References Cited

U.S. PATENT DOCUMENTS

| | | | |
|---|---|---|---|
| 170,524 | 11/1875 | Chapman | 29/256 |
| 1,381,101 | 6/1921 | Albertson | 29/426.5 X |
| 1,385,452 | 7/1921 | Hoffman | 29/256 |
| 1,493,534 | 5/1924 | Hardin | 29/256 |
| 1,710,835 | 4/1929 | Nielsen | 29/263 |
| 2,113,755 | 4/1938 | Billington | 29/256 |
| 2,305,076 | 12/1942 | Graham | 29/426.5 X |
| 2,380,980 | 8/1945 | Looney | 29/263 |
| 2,394,341 | 2/1946 | Strong | 29/253 X |
| 3,056,191 | 10/1962 | Felmet | 29/256 |
| 3,174,218 | 3/1965 | McConaha | 29/256 |
| 3,340,593 | 9/1967 | Savastano | 29/262 |
| 3,408,724 | 11/1968 | Hoeijenbos | 29/263 |
| 3,762,021 | 10/1973 | Racin | 29/263 |
| 3,791,011 | 2/1974 | Keys | 29/252 |
| 4,213,239 | 7/1980 | Filer | 29/252 X |
| 4,235,004 | 11/1980 | Floyd | 29/256 |
| 4,283,826 | 8/1981 | Miller | 29/252 |
| 4,959,899 | 10/1990 | Martin | 29/252 X |
| 4,967,460 | 11/1990 | Runyan et al. | 29/252 |

FOREIGN PATENT DOCUMENTS

| | | | |
|---|---|---|---|
| 0903069 | 2/1982 | U.S.S.R. | 29/252 |

*Primary Examiner*—Mark Rosenbaum
*Assistant Examiner*—C. Richard Martin
*Attorney, Agent, or Firm*—Kenneth G. Pritchard

[57] ABSTRACT

A hydraulically activated ram suitable for insertion into blind holes for a bearing has dogs which extend within the hole when the ram is activated. Further activation of the ram results in the ram contacting the blind hole surface and removing the bearing via pressure to the dogs as the ram continues to extend.

5 Claims, 3 Drawing Sheets

HYDRAULIC BEARING PULLER

BACKGROUND OF THE INVENTION

1. Field of the Invention

This invention pertains to devices and methods for removing bearings and similar items. Specifically this invention pertains to devices and methods for removing bearings mounted in front of a blind hole by hydraulic pressure.

2. Description of the Prior Art

Bearing for wheels and other similar applications are frequently mounted in situations where the bearing can only be accessed from one side. Space is normally left behind the bearing that can only be reached through the bearing. This space is commonly referred to as a blind hole.

After bearings have been used for a while, they tend to become firmly seated. When the bearing needed to be removed or replaced the blind hole provides a limited space to reach behind the bearing. In the past various multiple jaw or finger pullers were used to grasp the bearing. Inclined planes were used to pry them out. In desperation cutting torches are sometimes used to remove the bearing. All of the previous devices have had limited effect in applying force to the blind hole side of the bearing.

One device to apply direct force from the blind hole side of the bearing requires converting rotational motion into linear motion. No previous devices have used hydraulic pressure to remove bearings from a blind hole.

Accordingly, it is an object of the present invention to provide a device which applies hydraulic pressure directly behind the bearing or from the blind hole side to remove the bearing. Further it is an object of the present invention to describe a method for removing bearings by driving them straight out from the blind hole side.

SUMMARY OF THE INVENTION

In one embodiment of this invention, a hydraulic ram is mounted in a housing. The front end of the housing has several dogs mounted in the front end. The dogs are held within the housing by a retainer. A hydraulic pumping source is connected to the back end of the housing. When the pumping source pumps into the housing, the ram extends from the front end of the housing. As the ram extends, it over powers the retainer and forces the dogs out the sides of the housing's front end inside the blind hole. As the ram contacts the limits of the blind hole the housing has to move away from the ram and due to the extended dogs, the bearing goes with the housing.

DESCRIPTION OF THE PREFERRED EMBODIMENT

Figure 1:
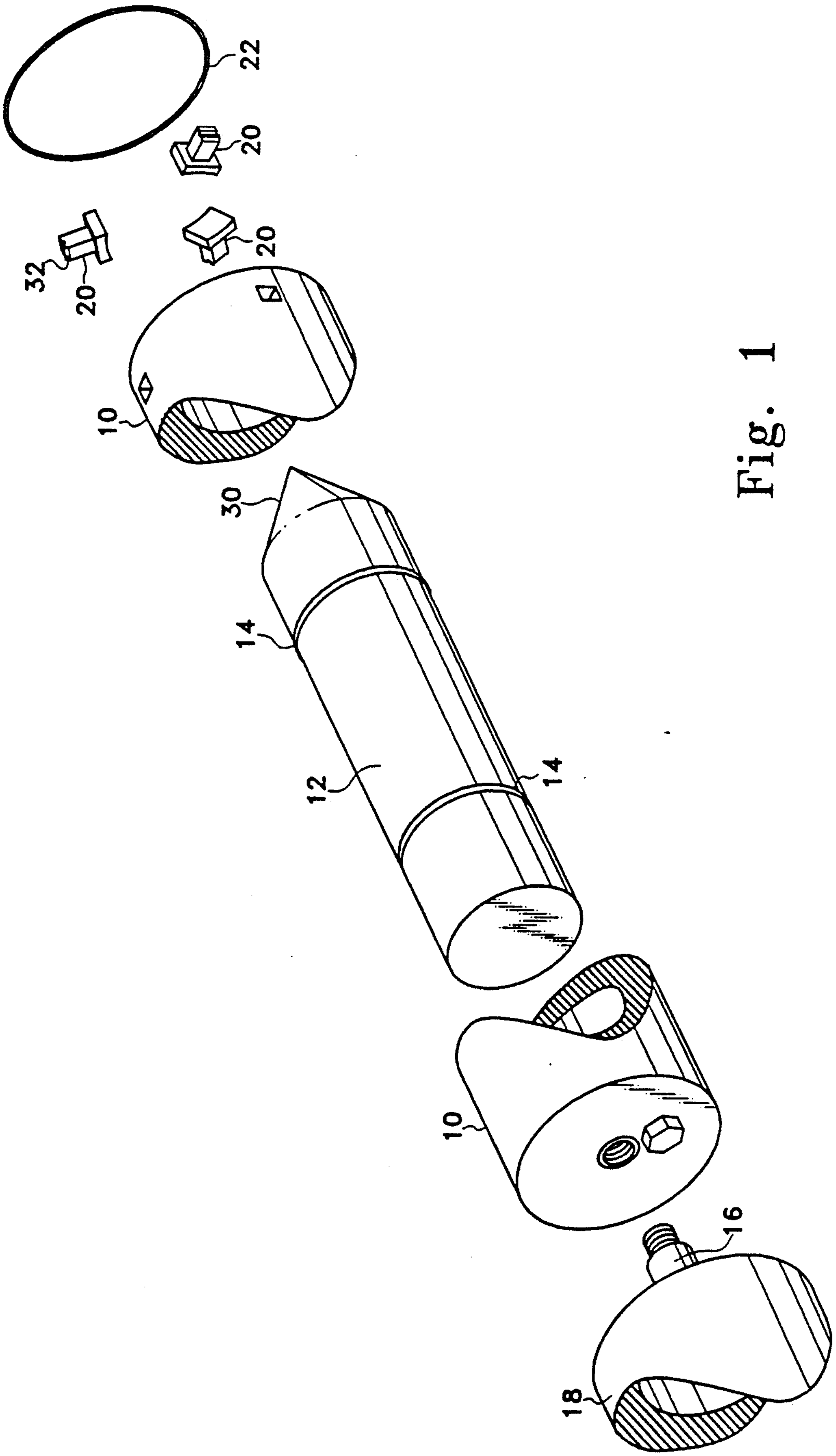
FIG. 1 is a disassembled perspective view of the present invention.

In FIG. 1, a housing 10 is shaped to fit into a bearing. Within housing 10, a ram 12 is placed to be operated by hydraulic pressure. 0 rings 14 can be placed between housing 10 and ram 12 to improve smooth motion of ram 12. A hydraulic fitting 16 connects the back end of housing 10 to a hydraulic pump 18.

When ram 12 has no hydraulic pressure behind it, retracted ram 12 is completely within housing 10. At the front end of housing 10 are mounted at least two dogs 20. Dogs 20 are held within housing 10 by a retainer 22. Retainer 22 can be an elastic band recessed within dogs 20 so the exterior of housing 10 is smooth when there is no pressure behind ram 12.

Figure 2:
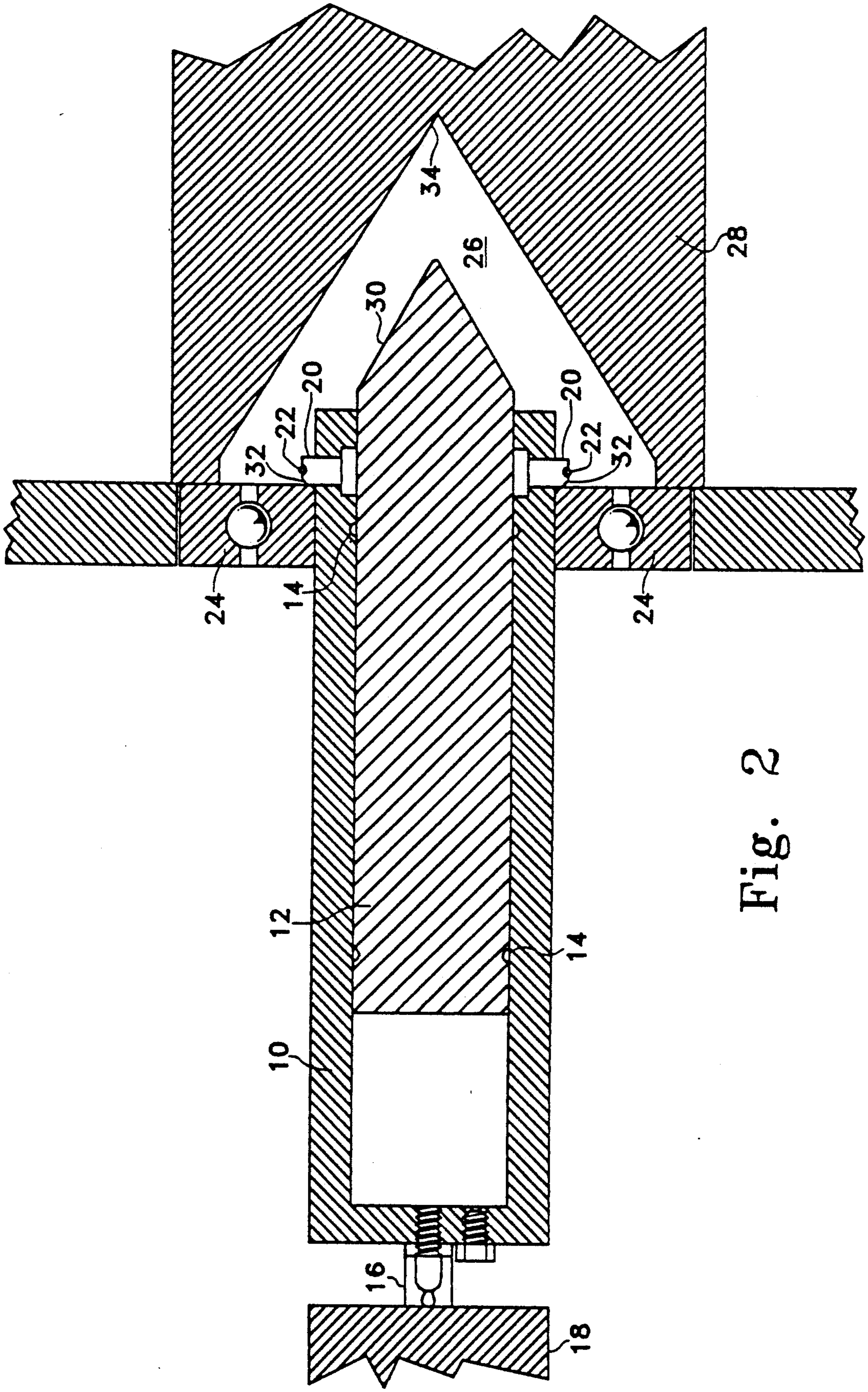
FIG. 2 is a cross-sectional view of the present invention.

FIG. 2 shows a cross section of the present invention as it is to be used. A bearing 24 is mounted in front of a blind hole 26. Housing 10 has an exterior radius that is smaller than the opening in bearing 24. This permits housing 10 to be inserted through bearing 24 into blind hole 26 as shown. As shown in FIG. 2, dogs 20 have been extended perpendicularly from the direction of movement of ram 12 into blind hole 26. Dogs 20 extend to a greater external radius than housing 10 after they are inside blind hole 26. Blind hole 26 is in a crankshaft 28 or similar device. Ram 12, which can have a tapered head 30, has been extended by hydraulic pump 18 past dogs 20 causing them to extend outside housing 10 and behind bearing 24. Dogs 20 can have a cammed surface 32 to insure they do not wedge against bearing 24 when they are extended. As ram 12 continues to extend, it will eventually make contact with wall 34 which is the limit of blind hole 26. Tapered head 30 reduces the cutting action of ram 12 against wall 34. As pressure continues to build against ram 12 after it makes contact with wall 34, housing 10 in effect extends from ram 12 and dogs 20 take bearing 24 with them.

Figure 3:
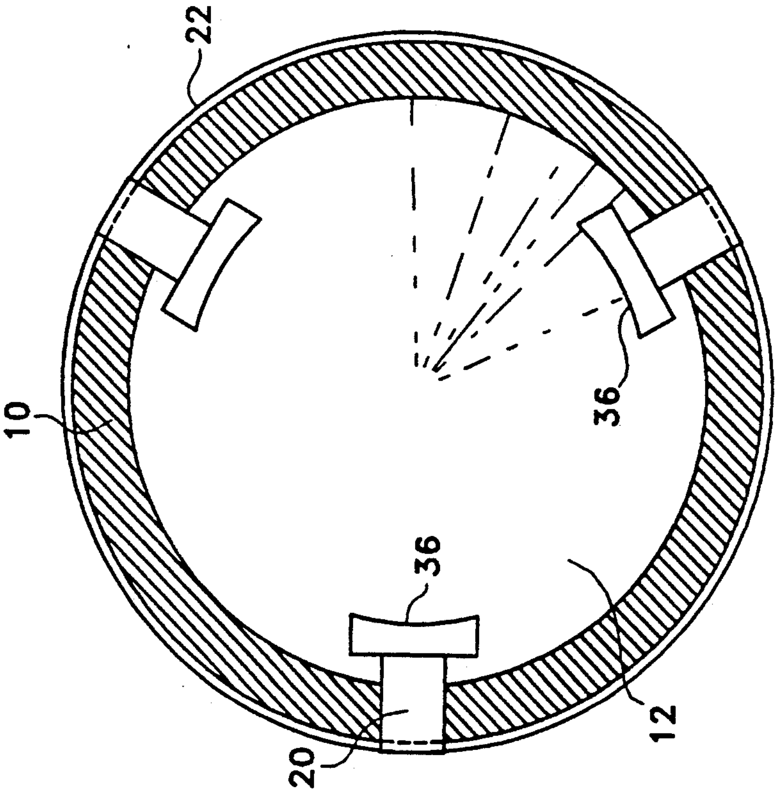

FIG. 3 is an end view of dogs 20 with retainer 22 when dogs 20 are retracted within housing 10. Retainer 22 can be a spring or even rubber band. The inner surface 36 of dogs 20 can be cammed as shown. Camming of inner surface 36 avoids binding and, if tapered end 30 is used, it serves as an inclined plane to extend dogs 20. Three dogs 20 are shown but other numbers from two on up can be used.

Figure 4:
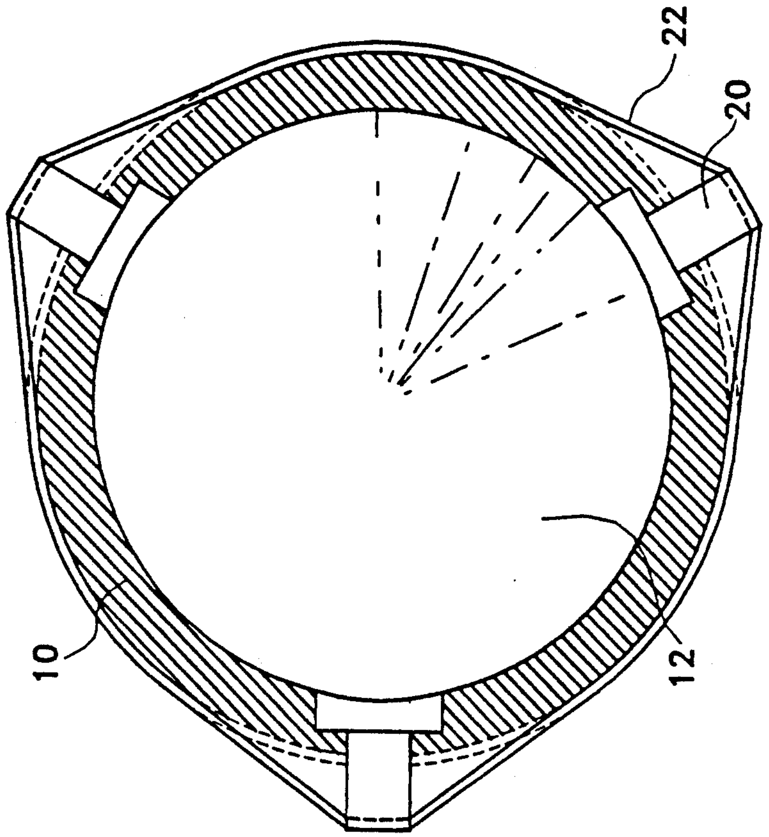
FIGS. 3 and 4 are views of the dogs and retainer for the present invention.

FIG. 4 shows dogs 20 extended from the end after ram 12 is extended at least as far as shown in FIG. 2.

FIG. 3 and 4 are end on views of ram 12. As tapered end 30 moves forward into the blind hole 26 tapered end 30 makes contact with inner surfaces 36 and moves them radially outward to the positions shown in FIG. 4. When extended, dogs 20 have a greater external radius than housing 10 as shown in FIG. 4.

What is claimed is:

1. A blind hole bearing puller comprising:

a housing, with an external radius less than an opening in the bearing to be pulled, having a front end and a back end;

a hydraulic ram placed within said housing;

a hydraulic pumping source connected to said housing's back end;

at least two dogs mounted in the front end of said housing such that when said hydraulic ram moves past said dogs, said dogs extend radially outward from said housing to a radius greater than said housing; and a retaining band operably connected to each of said dogs such that when said hydraulic ram has not moved past said front end of said housing said retaining band prevents said dogs from having an exterior radius greater than the exterior radius of said housing and when said hydraulic ram has moved past said front end of said housing said retaining band does not prevent said hydraulic ram from moving said dogs in a direction perpendicular to the direction of motion of said hydraulic ram so that said dogs have a greater exterior radius than that of said housing.

2. A blind hole bearing puller as described in claim 1 further comprising at least two O-rings placed between said housing and said hydraulic ram.

3. A blind hole bearing puller as described in claim 2 where said dogs are cammed where they contact said hydraulic ram and where they contact a bearing.

4. A blind hole bearing puller as described in claim 1 where said dogs are cammed where they contact said hydraulic ram and where they contact a bearing.

5. A method of removing a bearing from a blind hole mounting comprising the steps of:

1. placing a hydraulic ram inside a housing having a front end and a back end;
2. mounting at least two dogs in the front end of said housing;
3. connecting a retainer to said dogs such that said dogs are radially retracted within said housing;
4. attaching a hydraulic pumping source to the back end of said housing;
5. inserting the front end of said housing into a bearing to be pulled;
6. pumping hydraulic fluid into said housing such that said hydraulic ram axially extends from said front end, forcing such dogs to extend radially outward from the front end of said housing said ram extends;
7. extending said hydraulic ram until it contacts a bottom of said blind hole;
8. continuing to extend the hydraulic ram after it contacts the bottom of said blind hole thereby causing said housing via said dogs to exert an axially opposite force upon said bearing until said bearing is removed from said blind hole.

* * * * *